United States Patent [19]
Einkauf

[11] Patent Number: 5,841,443
[45] Date of Patent: Nov. 24, 1998

[54] METHOD FOR TRIANGLE SUBDIVISION IN COMPUTER GRAPHICS TEXTURE MAPPING TO ELIMINATE ARTIFACTS IN HIGH PERSPECTIVE POLYGONS

[75] Inventor: Mark Alan Einkauf, Leander, Tex.

[73] Assignee: S3 Incorporated, Santa Clara, Calif.

[21] Appl. No.: 803,460

[22] Filed: Feb. 20, 1997

[51] Int. Cl.$^6$ .................................................. G06F 15/00
[52] U.S. Cl. ............................................................. 345/430
[58] Field of Search ................................... 345/430, 433, 345/441, 117, 118

[56] References Cited

U.S. PATENT DOCUMENTS

| | | | |
|---|---|---|---|
| 4,609,917 | 9/1986 | Shen | 245/433 |
| 4,656,467 | 4/1987 | Strolle | 345/430 |
| 4,727,365 | 2/1988 | Bunker et al. | 340/728 |

*Primary Examiner*—Phu K. Nguyen
*Attorney, Agent, or Firm*—Fenwick & West LLP

[57] ABSTRACT

The system and method of the present invention performs an iterative operation that subdivides selected polygons (e.g., triangles) having high perspective ratios into a plurality of smaller polygons to limit artifact creation during the rendering/texture map processes. The present invention is particularly well suited for interpolation driven rendering/texture map processes. Processing logic of the present invention analyzes each polygon stored in display list memory of a graphics accelerator or graphics subsystem and determines a perspective ratio between adjacent vertices of the polygon. If the perspective ratio is greater than a pre-selected limit, the edge bounded by the vertices is subdivided at the mid-point and new polygons are created. The process is iterative until all polygons have perspective ratios that are less than the pre-selected limit, at which time the object data can be displayed by the hardware. Perspective values (w) and three dimensional coordinates (x, y, z) for each created mid-point are calculated by averaging the perspective values at the vertices bounding the edge. Texture coordinates at the mid-point of a divided edge (umid, vmid) are calculated and then interpolated across the resulting polygon to determine the texels values of the image at each pixel within the boundary of the polygon. The present invention eliminates artifact creation when used with interpolation driven rendering/texture map processes that might otherwise not properly process polygons with large perspective.

20 Claims, 7 Drawing Sheets

METHOD FOR TRIANGLE SUBDIVISION IN COMPUTER GRAPHICS TEXTURE MAPPING TO ELIMINATE ARTIFACTS IN HIGH PERSPECTIVE POLYGONS

FIELD OF THE INVENTION

The present invention relates to the field of graphics imaging and the display of images on a screen. More particularly, the present invention relates to a method for presenting computer generated objects on a two-dimensional graphics display with perspective texture mapping in a computer controlled graphics display system.

BACKGROUND OF THE INVENTION

It is becoming more common for workstations and general purpose computer systems to be used for visual simulations. Such simulations are particularly useful in high end systems for industrial modeling applications and in lower end systems for entertainment (e.g., simulations, computer games, multi-media applications, etc.). Computer controlled graphics systems display graphics objects on a 2 dimensional (2-D) display; the graphics objects being composed of graphics primitive elements ("graphics primitives") that may include, for instance, points, lines, polygons, etc. represented using three dimensional (3-D) data structures (e.g., x, y, z). As is well known, the object displayed is represented internally by the graphics system with three dimensional (3-D) data structures (e.g., x, y, z) which are transformed into 2-D elements (e.g., x, y) which are then used to render a 2-D image of the 3-D object.

Texture mapping refers to techniques for adding surface detail to areas or surfaces of these 3-D graphics objects displayed on the 2-D display. Since the original graphics object is 3-D, texture mapping often involves maintaining certain perspective attributes with respect to the surface detail added to the object. Generally, texture mapping occurs by accessing encoded surface detail points or "texels" from a memory which stores the surface detail and then transferring the surface detail texels to predetermined points of the graphics primitive that is texture mapped. More specifically, texture mapping operates by applying color or visual attributes of texels of the (u, v) texture map to corresponding pixels of the graphics object on a display screen. In texture mapping, color values for pixels in (x, y) display coordinate space are determined based on sampled texture map values from (u, v) coordinates. After texture mapping, a version of the texture image is visible on surfaces of the object. The manner in which the texels are accessed and used to provide the perspective is a complex process that can utilize interpolation which increases processing speed but provides only an "estimation" of the true perspective condition.

There are three types of texture mapping including linear, second order homogeneous perspective and second order non-homogeneous perspective. In linear texture mapping, texels of a texture map are generally mapped onto pixels of a 2-D graphics primitive linearly whereby the rate of sampling in texel space (u, v) with respect to the screen coordinate (x, y) update rate is constant, e.g., du/dx and du/dy are constant values. In perspective texture mapping, texels of a texture map are generally mapped onto pixels of a 3-D graphics object that is displayed in 2-D space (x, y) wherein the rate of sampling in texel space with respect to the rate of screen coordinate update rate is not constant. Perspective texture mapping, as discussed above, therefore features an illusion of depth which is created by varying the sampling rate of the texture map during the normal linearly performed polygon rendering process on the display screen.

In one system, a graphics subsystem (accelerator) performs the necessary processing to generate the simulation in real-time using interpolation driven processes to perform texture mapping. Typically, the graphics subsystem includes local memory for storing graphics data in a "display list" and a graphics engine that determines the texture (e.g., texture mapping) to be applied to picture elements (pixels) to form the simulation on the computer systems graphics display. Using techniques that are well understood by those skilled in the art, display images are first decomposed into graphics primitives comprising multiple polygons each of which may be readily rotated or otherwise transposed by the graphics subsystem before being sent to the frame buffer memory. As the perspective of the viewer changes, the displayed images must be redrawn to provide the proper visual perspective. Accordingly, graphics engines must be capable of mapping the texture onto the polygons in real-time as the position of the polygons are rotated, translated or otherwise shifted.

Using techniques to provide correct perspective, the graphics engine maps the three dimensional coordinates (x, y, z) of the polygon to corresponding texture coordinates (u, v). Whenever a pixel in the projection of the image is about to be plotted on the display screen, an association is formed between the vertices of the polygon and the pixels of the image while the image is being rendered. Also associated with each vertex is a perspective value, W, that defines the spatial relation of objects with in respect to their relative distance and position as they might appear to the eye of a viewer when rendered on the display.

In low cost graphic engines interpolation driven texture mapping and rendering processes are used to speed the rendering process and limit memory requirements. However, maintaining proper orientation of the texture map with respect to the polygon as the perspective changes and interpolating interior (u, v) texels requires extensive computing power to prevent distortion, artifacts, wavy appearances, alaising or other rendering errors. For images such as would be displayed in a video game with, by way of example, a road disappearing into the distance at infinity (FIG. 2), the perspective can vary from W=1 for objects near the front of the screen perceived as close to the viewer to W=6 or W=10 (or greater) for objects receding into the distance near the back of the screen. Massive perspective (e.g., W>5) in real-time computer simulations often cause hardware rendering engines to break down creating readily visible artifacts in the image when displayed. In one system, it has been determined that the breakdown point commonly occurs whenever a perspective ratio varies by more than about 1.5. It would be advantageous to provide a system that performs real-time simulation that avoids artifacts when processing images with massive perspective. It would be further advantageous to provide such a system that operates in conjunction with an interpolation driven texture mapping and rendering system. The present invention provides this advantageous capability A further problem often encountered in rendering graphic images arises when two polygons share a common or co-linear edge. Depending on the manner in which the graphics subsystem interprets the image, however, the resulting object as rendered on the display will often have missing pixels or gaps along the common edge. Such gaps occur when the process employed by the graphics subsystem is not able to walk to common endpoints. Accordingly, it is desirable to draw polygons having a co-linear edge without tearing or creation of false edges or gaps. The present invention provides this advantageous capability.

SUMMARY OF THE INVENTION

The present invention relates to rendering three-dimensional graphics images on a computer controlled display system and more particularly to a system and method that eliminates artifacts created when large polygons with high perspective ratios are rendered/ texture mapped. The present invention is useful within a computer controlled display system utilizing interpolation driven rendering/ texture mapping processes. The system and method of the present invention performs an iterative operation that subdivides selected polygons into a plurality of smaller polygons to limit artifact creation during the interpolation driven rendering/texture mapping processes.

Specifically, the processing logic of the present invention analyzes each polygon stored in display list memory of a graphics accelerator or graphics subsystem and determines a perspective ratio between adjacent vertices of the polygon. If the perspective ratio is greater than a pre-selected limit, the edge bounded by the vertices is subdivided at the mid-point and new triangles created. The process is iterative until all polygons have perspective ratios that are less than the pre-selected limit at which time the object data can be rasterized and displayed by the hardware.

Since the subdivision is based on determining the midpoint of edges rather than vertices of the polygon, any original polygon that shares the selected edge (and there might be several) will share a common vertex because the edge will be subdivided at the same mid-point thereby limiting creation of artifacts even if the edge appears later in the data stream. Further, since the processing logic of the present invention consistently subdivides the edge each time it is encountered, objects are consistently rendered regardless of the coordinates of the vertices of the various polygons sharing the edge or having a co-incident edge.

The present invention calculates perspective values (w) and new coordinates (x, y, z) for each mid-point based on a simple average of the perspective values at the vertices bounding the edge. Texture coordinates at the mid-point of a divided edge (umid, vmid) are calculated by the processing logic and are interpolated across the polygon to determine the texel value of the image at each pixel within the boundary of the polygon.

DESCRIPTION OF THE PREFERRED EMBODIMENTS

Figure 1:
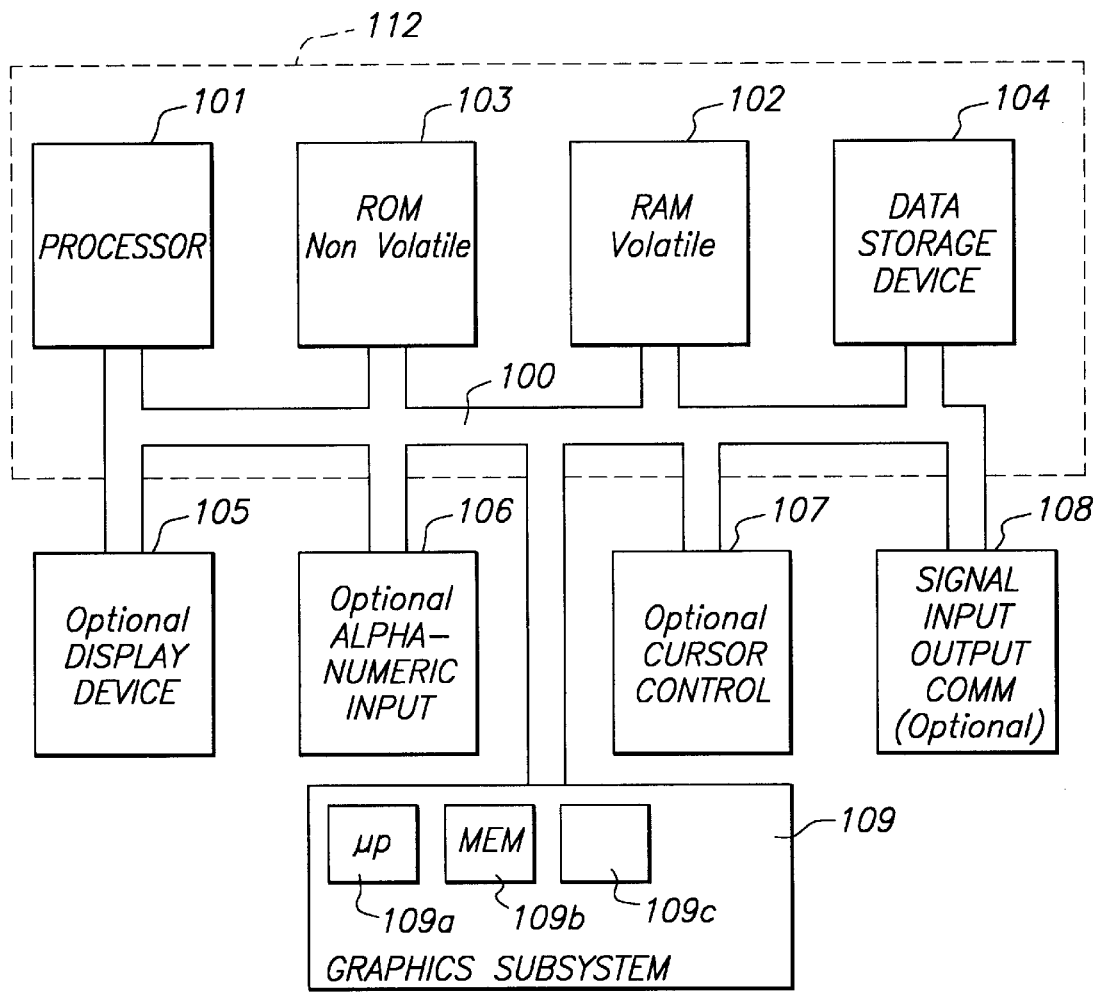
FIG. 1 illustrates a computer controlled graphics display system having a host processor and a graphics subsystem with the capability of rendering visual simulations on a display screen.

In the following description of the preferred embodiment, reference is made to the accompanying drawings which form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with a computer system equipped to display graphics in real-time. However, it is contemplated that the present invention can be used in conjunction with other digital display systems. Reference will now be made in detail to the preferred embodiments of the invention, examples of which are illustrated in the accompanying drawings. Wherever possible, the same reference numbers will be used throughout in the drawings to refer to the same or like components.

NOTATION AND NOMENCLATURE

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER SYSTEM PLATFORM

Refer to FIG. 1 which illustrates a computer controlled display system ("computer system") 112. Within the following discussions of the present invention, certain processes (e.g., processes 400, 485, and 610) are discussed that are realized, in one implementation, as a series of instructions (e.g., software program) that reside within computer readable memory units of system 112 and executed by processors of system 112. When executed, the instructions cause the computer system 112 to perform specific actions and exhibit specific behavior which is described in detail to follow.

In general, computer system 112 used by the present invention comprises an address/data bus 100 for communicating information, one or more central processors 101 coupled with the bus 100 for processing information and instructions, a computer readable volatile memory unit 102 (e.g., random access memory, static RAM, dynamic, RAM, etc.) coupled with the bus 100 for storing information and instructions for the central processor(s) 101, a computer readable non-volatile memory unit (e.g., read only memory, programmable ROM, flash memory, EPROM, EEPROM, etc.) coupled with the bus 100 for storing static information and instructions for the processor(s) 101. As will be appreciated by person of ordinary skill in the art, memory 104 may contain information, such as application programs, network communication programs, operating systems, data, graphics display data etc.

System 112 also includes a mass storage computer readable data storage device 104 (hard drive or floppy) such as a magnetic or optical disk and disk drive coupled with the bus 100 for storing information and instructions. Optionally, system 112 can include a display device 105 for displaying information to the computer user, an optional alphanumeric input device 106 including alphanumeric and function keys coupled to the bus 100 for communicating information and command selections to the central processor(s) 101, an optional cursor control device 107 coupled to the bus for communicating user input information and command selections to the central processor(s) 101, and an optional signal generating device 108 coupled to the bus 100 for communicating command selections to the processor(s) 101. In one exemplary implementation, system 112 is an x86 microprocessor based computer system, but could equally be of a number of other various well known and commercially available platforms (e.g., DEC Alpha, Power PC, RISC based, etc.).

The host processor 101 provides data and control signals via bus 100 to a graphics subsystem 109. The graphics subsystem 109 typically contains a display processor 109a which executes/processes a series of display instructions and graphics primitives found within a display list stored in local volatile memory 109b. The display processor 109a supplies data and control signals to a frame buffer (not shown) which refreshes the display device 105 for rendering images (including graphics images). Specialized and well known circuits 109c are also included in graphics subsystem 109 for implementing sound and graphics special effects and perform high speed graphics processing. Although not shown, the graphics subsystem 109 can be directly coupled to drive display device 105. Graphics subsystem 109 also typically is granted high priority access to memory 104 for processing image data prior to display.

To display a three-dimensional (3-D) object on display 105, the object is decomposed by system 112 into a plurality of graphics commands and graphic primitives including, for example, polygons (e.g., triangles), lines and points to obtain a representation of the object. In one embodiment, polygons are triangles having three vertices, but could also include geometric representations having more than three vertices (e.g., rectangles, etc.). As used herein, the term polygon and triangles are used interchangeably unless specifically otherwise noted. The vertices of the triangles are described by respective three dimensional Cartesian coordinates (x, y, z). The vertices are stored in either memory 104 or in the local memory 109b of graphics subsystem 112 and define the object's shape and position.

System 112 applies texture maps to the displayed surfaces of the graphics triangles to provide surface shading, volume rendering or to otherwise present a realistic appearance of the object. A texture is image data ("texels") that are mapped or matched to the pixels of the polygons of the graphics primitives so that the displayed object has the appearance of realism. Graphic subsystem 109 maps texture by matching texture coordinates (u, v) with a corresponding vertex of the polygon and then rendering the image on the display screen. In one embodiment, texture inside the polygon is determined by interpolation within subsystem 109; one process of which is described in more detail in copending patent application entitled Non-Homogenous Second Order Perspective Texture Mapping Using Linear Interpolation Parameters, by Gautam P. Vaswani et al., filed on Dec. 30, 1996, Ser. No. 08/803,460, and assigned to the assignee of the present invention. In general, the basic steps of the texture mapping process are to: assign texture coordinates to the vertices of each polygon to define a mapping function from texture coordinate space to the display coordinates in display space; interpolate to determine corresponding texture coordinates for each pixel coordinate within the polygon based on the texture coordinates assigned to the polygon's vertices and based on certain parameters computed for the polygon; and assign textual values to each pixel inside the polygon during the rendering process based on the determined texel coordinates.

GENERAL OPERATION OF PRESENT INVENTION

Figure 2:
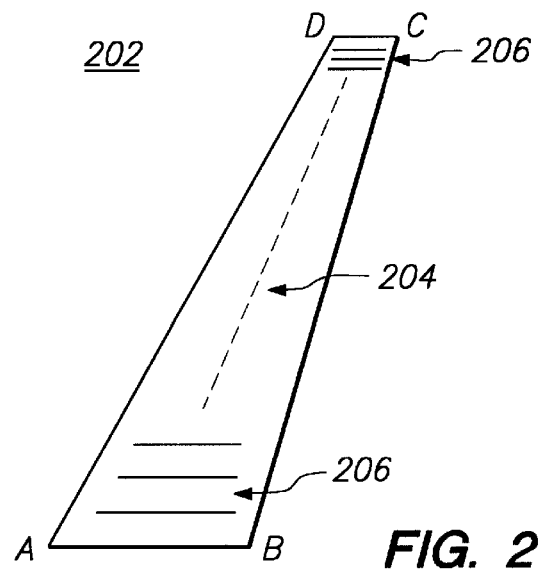
FIG. 2 is an illustrative representation of a displayed image with perspective within a visual simulation.

Referring now to FIG. 2, the present invention is illustrated by way of example using an airport runway 202 as the object to be rendered on display 105. Runway 202 is shown composed of two polygons, one polygon having vertices A, B, D and the other polygon having vertices B, D, C. Texture mapping provides the appearance of asphalt or concrete to runway 202 and applies a centerline 204, and end-of-runway stripes 206. The position of each vertex on the display screen is determined based on a viewing angle and based on the set of Cartesian coordinates (x, y, z) for each vertex (A, B, C, D). Also associated with each of the vertices are well known perspective terms, WA, WB, WC and WD, respectively for vertex A, B, C, and D. In general, when WA=WB=WC=WD=1, the polygon lies in the XY-plane with z=0 for each vertex and when WA=WB=WC=WD the corresponding vertices lie in a single XY-plane with a common Z coordinate for each vertex.

To maintain visual perspective as runway 202 is rotated with respect to a common viewing angle, the perspective terms (W) of the vertices change depending on the point of view of the observer. The perspective can vary from W=1 for objects near the front of the screen 105 which are perceived as close to the viewer, to W=6 or W=10 for objects receding into the distance near the back of the screen. Such large perspective (e.g., W>6) in real-time computer simulations often cause hardware rendering engines to break down creating readily visible artifacts. This is particularly true when linear interpolation rendering/texture mapping processes of subsystem 109 are used which perform estimations to determine the proper texture map values. It has been determined that with respect to the above cited linear interpolation process, the breakdown point begins to occur when the ratio of the perspective terms amount to 1.5 or more for any given triangle edge (an edge having a vertex pair from which the ration is determined).

Therefore, the present invention determines if the amount of perspective in a displayed image will create visible artifacts or distortion during the rendering process, and if so, the triangle is divided, and subdivided if need be, until it is determined that visible artifacts are removed. The operation of the present invention is first described generally, and then described in detail with respect to FIG. 4A and FIG. 4B.

Simultaneously with, or prior to, building a display list in local memory 109b, the present invention calculates and compares perspective ratios of each triangle to be displayed. Specifically, the perspective ratios of each vertex pair for each triangle edge are calculated. For instance, the ratios:

WA/WB, WB/WA, WB/WD, WD/WB, WD/WA, WA/WD are calculated for triangle ABD of FIG. 2 and WB/WC, WC/WB, WB/WD, WD/WB, WD/WC, WC/WD are calculated for triangle BDC of FIG. 2. If any of the above perspective ratios exceed a selected ratio threshold, the edge between the selected vertices is split (thus forming new triangles) by system 112 to prevent the creation of artifacts during the rendering process.

In accordance with the present invention, processing logic resident in either memory 104 (FIG. 1) or the local memory 109b of graphics subsystem 109 (or memory 103), compares each ratio to the given threshold and, in the event one or more edge pairs violate the threshold, subdivides the edge between the vertices corresponding to the perspective ratio and finds the mid-point of the edge. Splitting edges causes new triangles to be formed. If only one edge is split, two triangles result from one original triangle. If two edges need to be split in the original triangle, then three triangles result. If all three edges need to be split in the original triangle, then four triangles result. Edges are split via their mid-point. The midpoint is determined, in one preferred embodiment, by adding together the corresponding coordinates of the vertices of the edge using fixed point math and shifting the sum to affect a divide by two operation and a new vertex is assigned to the mid-point.

As described above, depending on the number of edges split, new triangles are created by connecting vertices and/or midpoints of the original triangle. The processing logic of the present invention then calculates new coordinates (x, y, z), new perspective terms (W), new texture coordinate values (u, v), and new color values (R, G, B), Red, Green, Blue, for any midpoints created. In one embodiment, a perspective term, WMid, is computed using a simple average of the perspective values at each of the vertices bounding the edge segment that has been divided. Accordingly, the perspective term, WMid, is assigned to the mid-point vertex and stored in memory 104 or memory 109b. It is appreciated that if any edge of the newly created triangles violates the threshold perspective ratio, that violating triangle is similarly split as described above, and so forth until all triangles of a particular display meet the perspective threshold.

Figure 3:
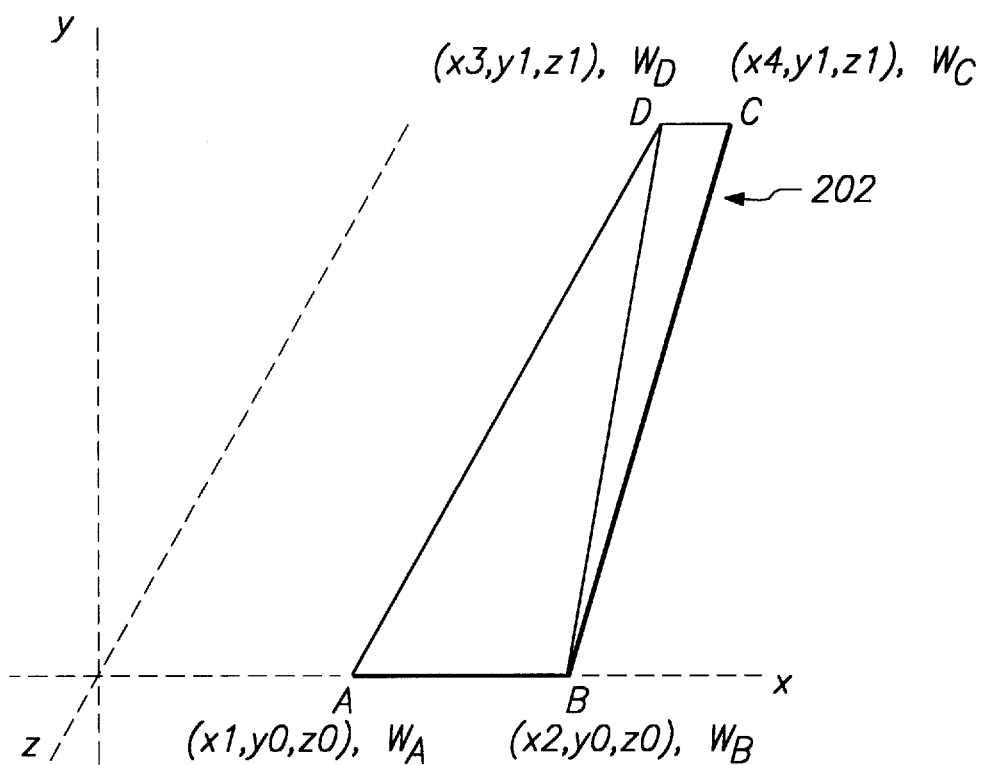
FIG. 3 is a representation of two polygons within a displayed image having perspective within a visual simulation.

In FIG. 3, exemplary runway 202 is illustrated superimposed on the 3-D coordinate system (x, y, z) without texture data. As shown, the runway polygon can be represented by two triangles ABD and BCD having a common edge BD. Advantageously, if only one edge violates the threshold perspective ratio, the processing logic of the present invention only subdivides triangles sharing that edge. However, if WD=10 and WA=WB=1, edges AB and BD will be divided in accordance with the below described process. After the processing logic has created a plurality of triangles each having perspective ratios of, in the preferred embodiment, between 1.25 and 1.5 (e.g., 1.45), or less, the resultant triangles are stored into a display list within local memory 109b to be further processed by graphics subsystem 109 and rendered on display 105.

Since divisions in accordance with the present invention are based on the edge rather than one or more vertices of the triangle, any original triangle that shares the selected edge, (and there might be several), will share the common midpoint vertex because the edge will be broken in the exact same manner thereby limiting artifacts even if you see the edge again with respect to another triangle much later in the display data stream. Since the process of the present invention consistently breaks up the edge each time it is encountered, the effect is to consistently rendering of the edge regardless of the coordinates of the vertices of the various triangles sharing the edge.

FLOWCHART OPERATION OF PRESENT INVENTION

Figure 4A:
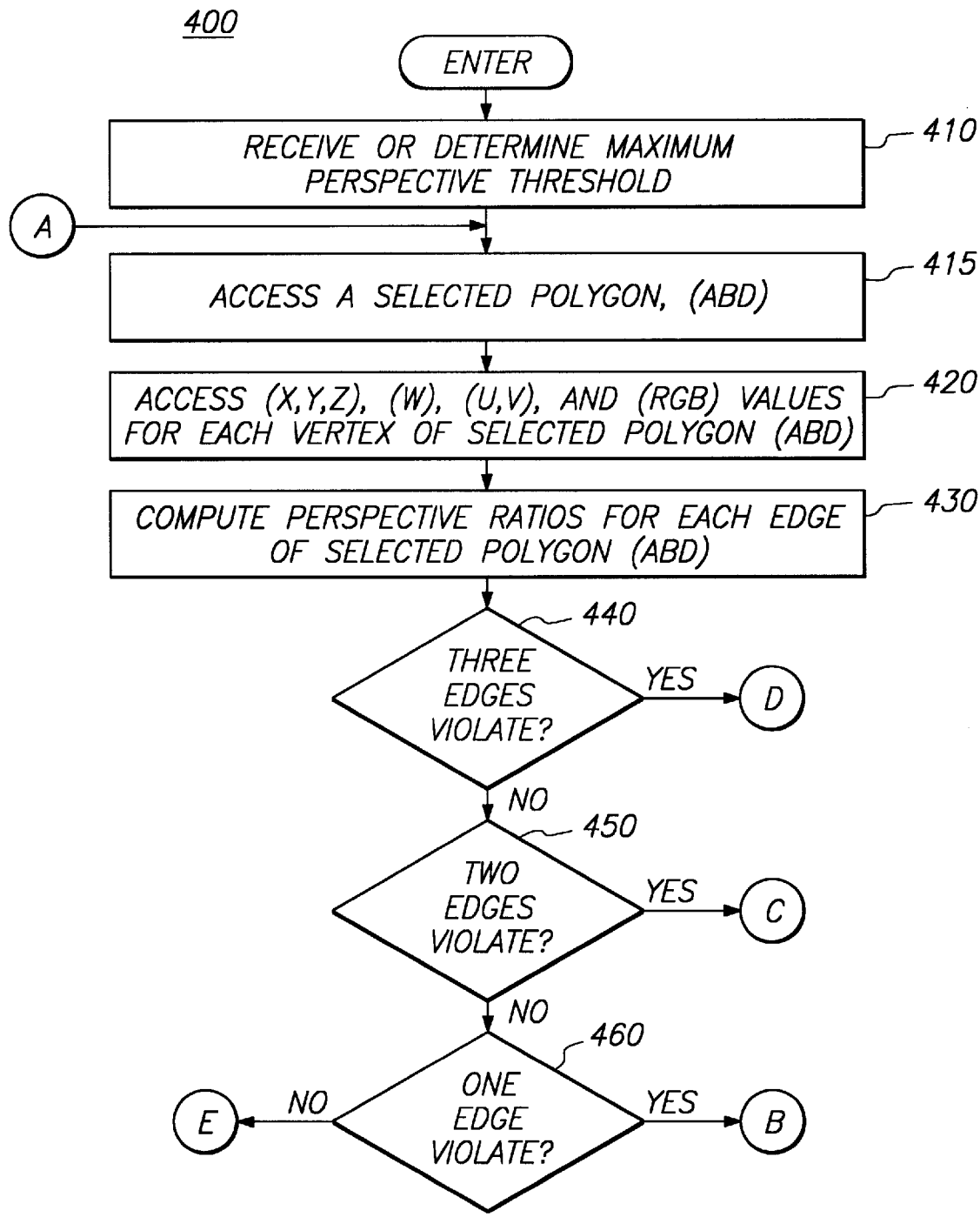
FIGS. 4A and 4B illustrate a flow diagram of processing logic in accordance with the present invention that is implemented on the computer controlled display system shown in FIG. 1 that divides polygons when one or more perspective ratios exceed a selected threshold before the polygons are rendered on the display system.
Figure 4B:
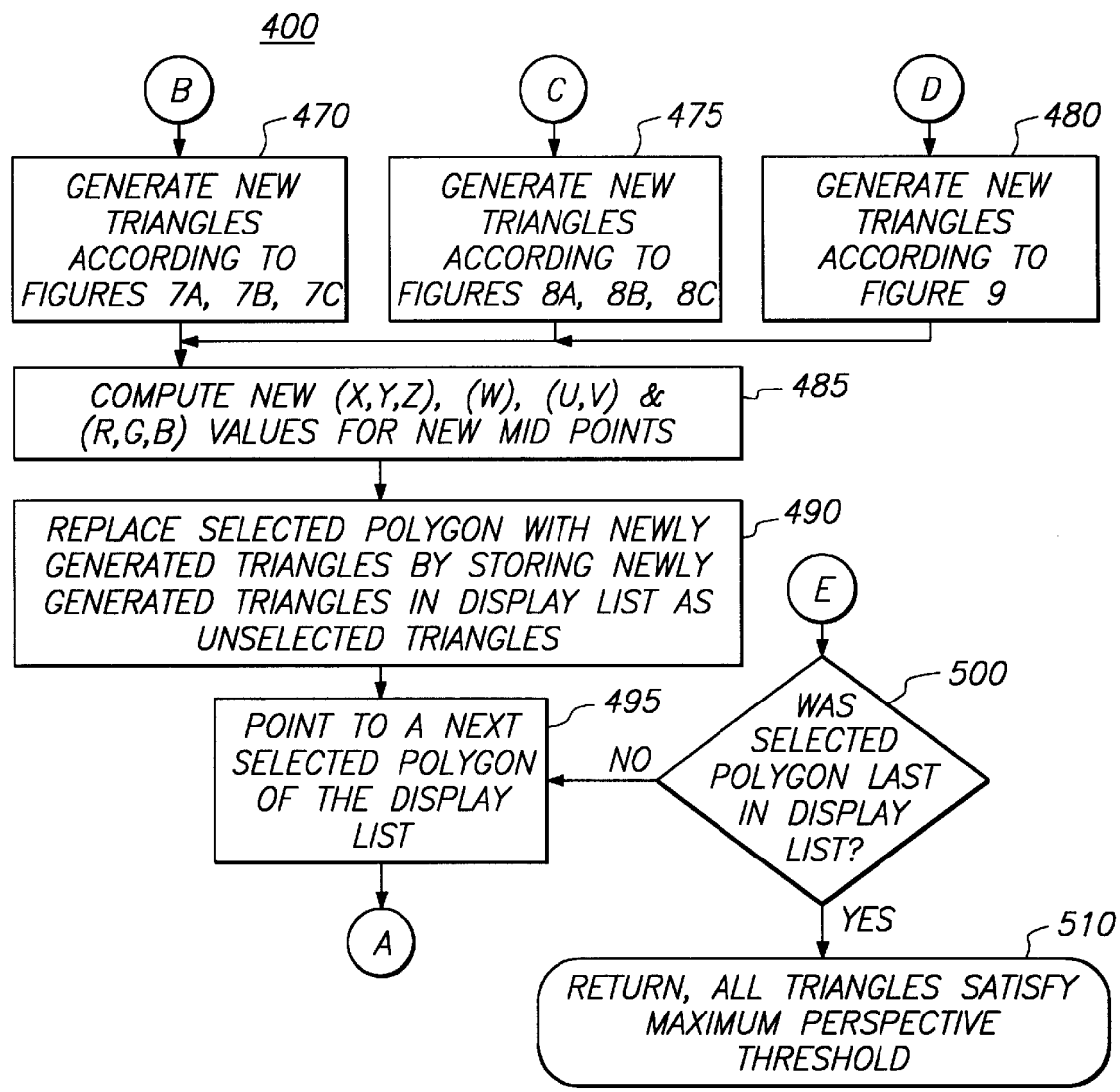

FIG. 4A and FIG. 4B illustrate a flow diagram of steps of process 400 executed by the present invention. It is appreciated that the processing logic 400 can be embedded in a pre-processor (e.g., hardcoded in memory 103 or another non-volatile memory unit of subsystem 109), performed by the host processor 101, or alternatively implemented as an application software module performed by graphics subsystem 109. In any event, process 400 is realized as software or instruction code stored in computer readable memory units of system 112. Processing logic 400 begins execution at an initialization step 410 (FIG. 4A) which includes selecting or receiving a maximum perspective ratio ("perspective threshold"), W_Ratio_Threshold, which in the preferred embodiment is 1.45 but can be varied. It is appreciated that the maximum perspective ratio, in one embodiment, is determined based on a user selected value from a performance/quality knob which is a user selectable knob that trades off speed of performance (e.g., rendering) versus image quality; in this embodiment the maximum perspective ratio can and is expected to change depending on user performance/quality determinations.

Figure 5A:
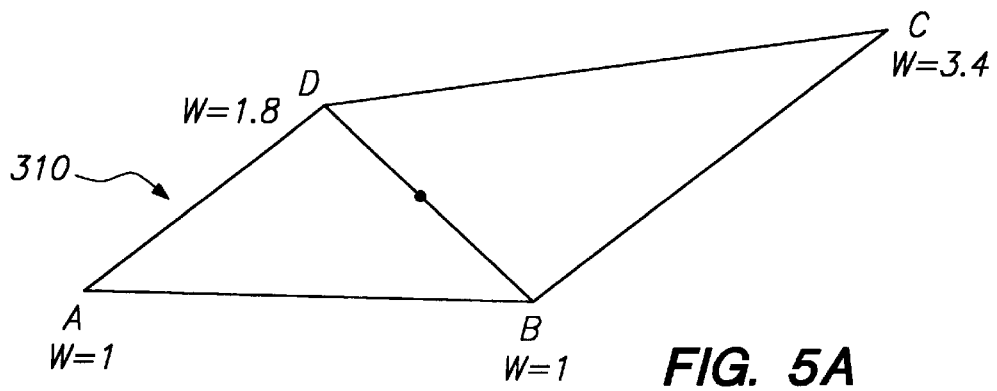
FIGS. 5A and FIG. 5B illustrate, respectively, a perspective view of a polygon having perspective ratios exceeding the preselected limit and a perspective view of the polygon after being split in accordance with the present invention.

At step 415, a polygon 310 (FIG. 5A) is selected (e.g., the selected polygon) from the display data list stored in local memory 109b of graphics subsystem 109. Alternatively, polygon 310 can be supplied from host processor 101 over bus 100. Polygon 310, as shown in FIG. 5A, includes vertices ABD. At step 420, the coordinates (x, y, z) of the vertices of the polygon of FIG. 5A are retrieved, the perspective terms WA, WB, and WD for vertices A, B, and D, respectively, are retrieved, and the RGB values and the texture coordinates (u, v) for each vertex of polygon 310 are retrieved.

Processing step 430 of FIG. 4A then calculates perspective ratios between each of the three edges of polygon ABD. Specifically, with respect to triangle ABD, perspective ratios are calculated for vertices pairs (edges): A and B; B and D; and A and D. The following perspective ratios are computed for each selected polygon at step 430:

Perspective Ratio1=WA/WB
Perspective Ratio2=WB/WA
Perspective Ratio3=WB/WD
Perspective Ratio4=WD/WB
Perspective Ratio5=WA/WD
Perspective Ratio6=WD/WA At step 440 of FIG. 4A, it is determined whether or not the computed perspective ratios of at least three different edges violate (e.g., exceed) the maximum perspective threshold amount, W_Ratio_Threshold. If so, step 480 (FIG. 4B) is entered. If not, then at step 450, it is determined whether or not the computed perspective ratios of two different edges violate (e.g., exceed) the maximum perspective threshold amount, W_Ratio_Threshold, and that three different edges do not violate. If so, step 475 (FIG. 4B) is entered. If not, then at step 460, it is determined whether or not the computed perspective ratios of one edge violates(e.g., exceed) the maximum perspective threshold amount, W_Ratio_Threshold, and that two nor three edges violate. If so, step 470 (FIG. 4B) is entered. If not, then step 500 (FIG. 4B) is entered.

Figure 9:
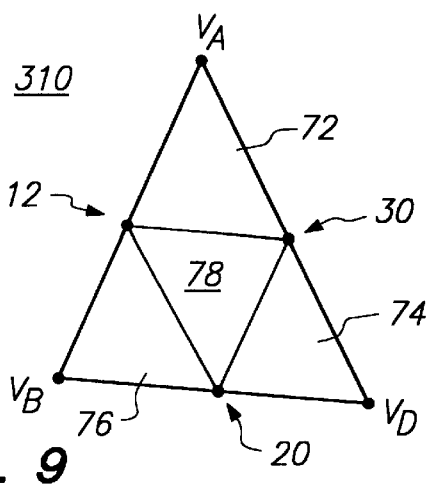
FIG. 9 illustrates one triangle split configuration when all of the three triangle edges exceed the perspective ratio in accordance with the present invention.

At step 440 of FIG. 4A, if three different edges of polygon 310 violate, then processing flows to step 480 of FIG. 4B where, as shown in FIG. 9, midpoints 12, 20 and 30 are determined and the selected polygon ABD 310 is divided with four new triangles 72, 74, 76, and 78 being generated. Triangle 72 is made up of vertex A, midpoint 12 and midpoint 30; triangle 74 is made up of vertex D, midpoint 20 and midpoint 30; triangle 76 is made up of vertex B, midpoint 20 and midpoint 12; and triangle 78 is made up of midpoints 12, 20 and 30. Then step 485 is entered.

In one particular embodiment of the present invention, the above perspective ratios can be computed by step 430 and then can be compared by step 440 (e.g., for triangle ABD) without using a divide operation according to the pseudo code format below:

```
vertex1.w = WA
vertex2.w = WB
vertex3.w = WD
max_w_ratio = W_Ratio_Threshold
w1_times_max = vertex1.w * max_w_ratio
w2_times_max = vertex2.w * max_w_ratio
w3_times_max = vertex3.w * max_w_ratio
if   ((vertex1.w < w2_times_max) AND (vertex1.w < w3_times_max)
     AND
     (vertex2.w < w1_times_max) AND (vertex2.w < w3_times_max)
     AND
     (vertex3.w < w1_times_max) AND (vertex3.w < w2_times_max))
then no perspective violation
else perspective violation
```

Figure 8A:
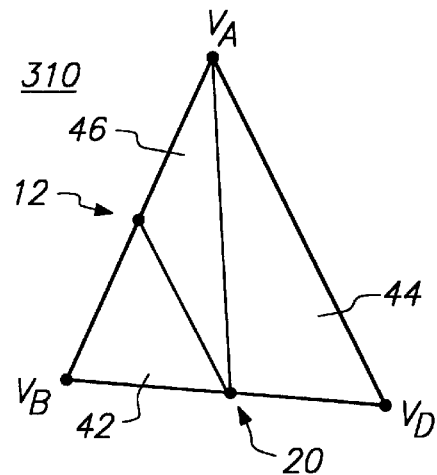
FIGS. 8A, 8B, and 8C illustrate three possible triangle split configurations when two of the three triangle edges exceed the perspective ratio in accordance with the present invention.
Figure 8B:
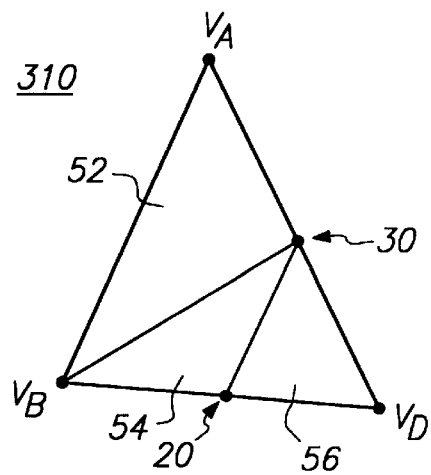
Figure 8C:
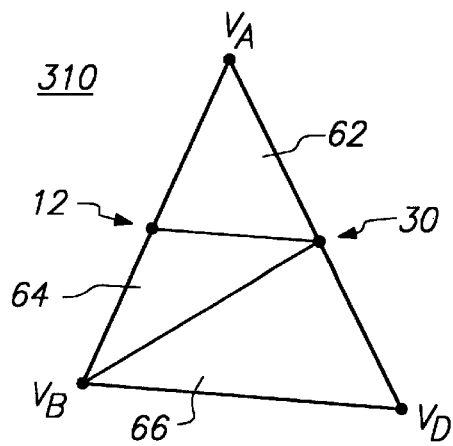

At step 450 of FIG. 4A, if two different edges of the selected polygon 310 violate, and three edges do not, then processing flows to step 475 of FIG. 4B where the present invention divides the selected polygon 310 into three triangles, depending on which two edges violate. As shown in FIG. 8A, if the edge between vertex A and vertex B violates and the edge between vertex B and vertex D violates, then at step 475, polygon 310 is divided into triangles 42, 44, and 46, with triangle 42 made up of vertex B, midpoint 12 and midpoint 20; triangle 44 made up of vertices A and D and midpoint 20; and triangle 46 made up of midpoints 12, 20 and vertex A. As shown in FIG. 8B, if the edge between vertex B and vertex D violates and the edge between vertex D and vertex A violates, then at step 475, polygon 310 is divided into triangles 52, 54, and 56, with triangle 52 made up of vertices A, B, and midpoint 30; triangle 54 made up of midpoints 20, 30 and vertex B; and triangle 56 made up of midpoints 20, 30 and vertex D. As shown in FIG. 8C, if the edge between vertex D and vertex A violates and the edge between vertex A and vertex B violates, then at step 475, polygon 310 is divided into triangles 62, 64, and 66, with triangle 62 made up of midpoints 12, 30 and vertex A; triangle 64 made up of midpoints 12, 30 and vertex B; and triangle 66 made up of vertices B, D and midpoint 30. Then step 485 is entered.

Figure 7A:
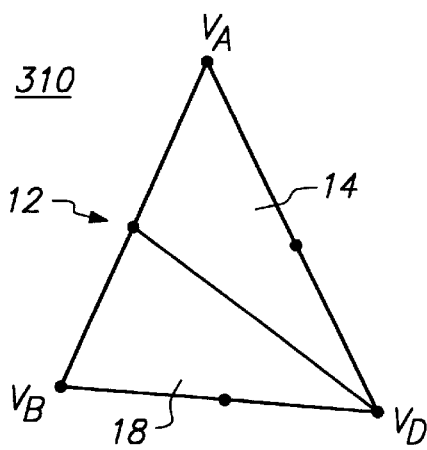
FIGS. 7A, 7B, and 7C illustrate three possible triangle split configurations when one of the three triangle edges exceeds the perspective ratio in accordance with the present invention.
Figure 7B:
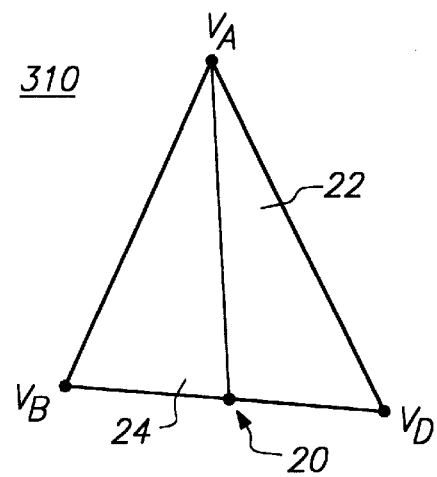
Figure 7C:
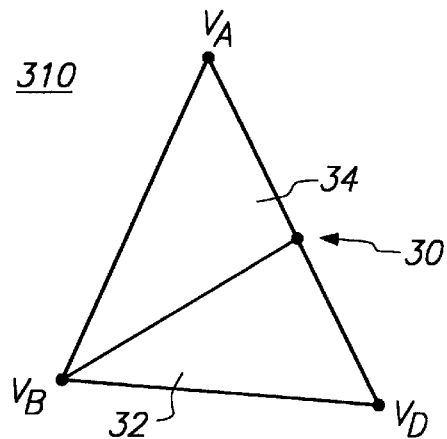

At step 450 of FIG. 4A, if one different edge violates and three edges and two edges do not, then processing flows to step 470 of FIG. 4B where the present invention divides the selected polygon 310 into two triangles, depending on which edge violates. As shown in FIG. 7A, if the edge between vertex A and vertex B violates, then at step 470, polygon 310 is divided into triangles 14 and 18, with triangle 14 made up of vertices A, D and midpoint 12; and triangle 18 made up of vertices B, D and midpoint 12. As shown in FIG. 7B, if the edge between vertex B and vertex D violates, then at step 470, polygon 310 is divided into triangles 22 and 24, with triangle 22 made up of vertices A, D and midpoint 20; and triangle 24 made up of vertices A, B and midpoint 20. As shown in FIG. 7C, if the edge between vertex A and vertex D violates, then at step 470, polygon 310 is divided into triangles 32 and 34, with triangle 32 made up of vertices B, D and midpoint 30; and triangle 34 made up of vertices A, B and midpoint 30. Then step 485 is entered.

At step 485 of FIG. 4B, the three dimensional coordinates (x, y, z), the colors (R, G, B), the texture coordinates (u, v) and the perspective term, (W, are computed for any midpoints (e.g., 12, 20, and 30) created by steps 470, 475, and 480. The manner in which these computations are performed is described in further detail with respect to FIG. 6A and FIG. 6B.

At step 490 of FIG. 4B, the selected polygon 310 is replaced by all new triangles generated by steps 470, 475 and 480. In particular, the selected polygon 310 (within the display list) is replaced by all newly generated triangles of steps 470, 475 and 480 with the newly generated triangles marked as "unselected" as stored in the display list. The new triangles are marked as unselected so that they can each be separately sent through process 400 and tested for perspective violations themselves. At step 495, a pointer is updated so that a new unselected polygon is selected as the selected polygon 310. Processing then returns to step 414 of FIG. 4A.

At step 500 of FIG. 4B, system 112 checks if the selected polygon 310 is the last polygon of the display list and there are no more "unselected" polygons in the display list. If so, process 400 completes and all triangles in the display list now satisfy the maximum perspective threshold. If not, then step 495 is entered to select a new polygon for processing. Upon each polygon being processed, the display list in 109*b* is then rendered for display. In one embodiment of the present invention, the interpolation driven rendering/texture map process cited above is used to perform texture mapping and image rendering onto display 105 (FIG. 1).

It is appreciated that process 400 of FIG. 4A and FIG. 4B is described with respect to a system that checks all polygons in the display list before rendering. However, process 400 is equally well suited for application within system that processes polygons 310 iteratively for display. For example, a system that decomposes a single polygon (from the display list) into its sub-triangles, stores the subtriangles into memory, divides any subtriangles if needed, then when all subtriangles meet the perspective threshold, renders all sub-triangles on display 105 and then accesses the next polygon of the display list.

EXAMPLES

Figure 5B:
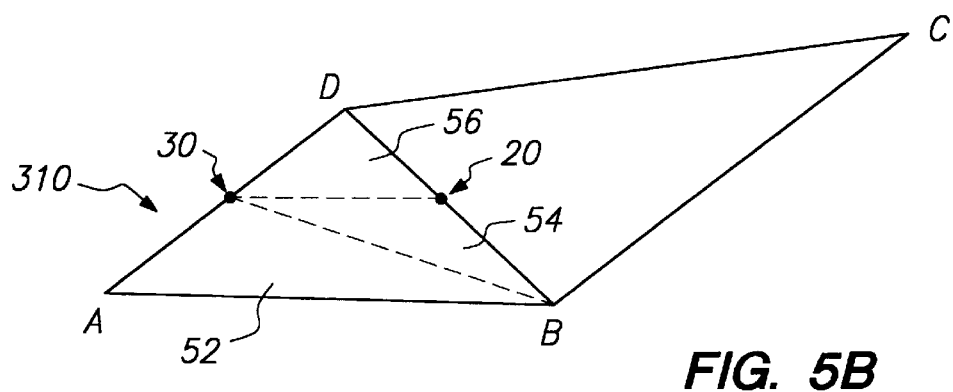

As an example of the operation of process 400, FIG. 5A illustrates perspective terms arbitrarily assigned for each vertex of polygon 310, with WA=1.0, WB=1.0 and WD=1.8. In ratio determining step 430, the ratio WD/WB is determined to be 1.8 (exceeding threshold of 1.45 as set by W_Ratio_Threshold) and this edge (BD) is determined to exceed the threshold. Further, the ratio WD/WA is also determined to be 1.8, so edge (DA) also exceeds the threshold. Accordingly, two edges violate, so step 450 responds in the affirmative. Polygon 310 is then split in accordance with FIG. 8B into triangles 52, 54, and 56 as shown in FIG. 5B. The newly generated triangles 52, 54, and 56 will be resubmitted to process 400 to determine whether the new perspective ratios exceed the limit set by W_Ratio_Threshold in accordance with the present invention.

Figure 5C:
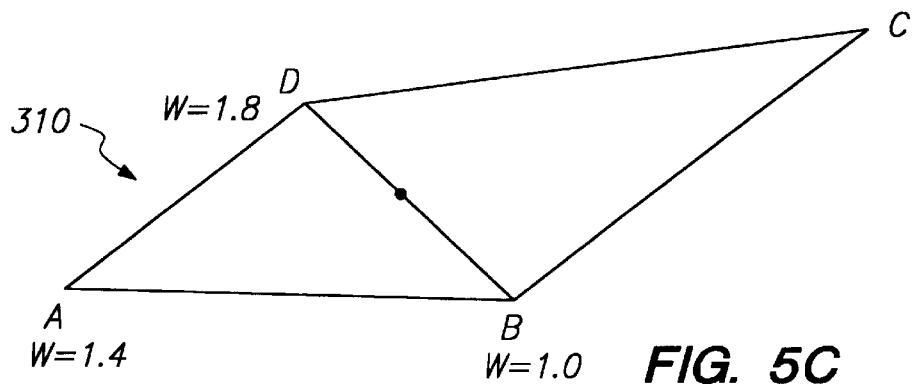
FIGS. 5C and FIG. 5D illustrate, respectively, a perspective view of a polygon having a perspective ratio exceeding the preselected limit and a perspective view of the polygon after being split in accordance with the present invention.
Figure 5D:
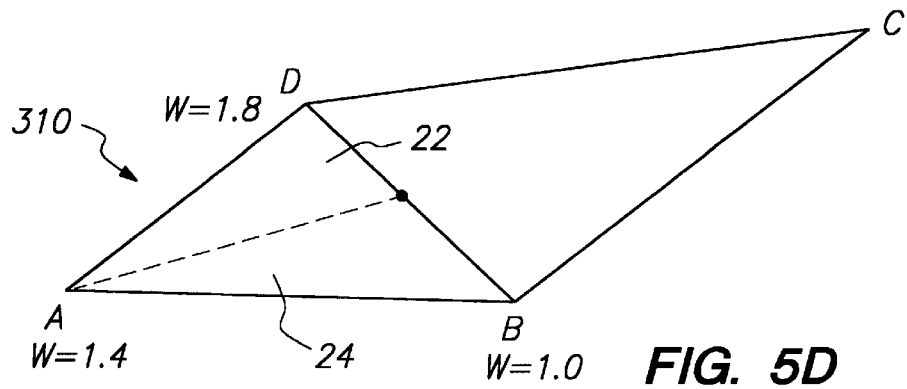

As another example, FIG. 5C illustrates that perspective terms for each vertex have been arbitrarily assigned to polygon 310 with WA=1.4, WB=1.0 and WD=1.8. In ratio determining step 430, the ratio WD/WB is determined to be 1.8 (exceeding threshold of 1.45 as set by W_Ratio_Threshold) and this edge is determined to exceed the threshold. However, the other edges do not violate the perspective threshold. Accordingly, one edge violates, so step 460 responds in the affirmative. Polygon 310 is then split in accordance with FIG. 7B into triangles 22, and 24 as shown in FIG. 5D. The newly generated triangles 22 and 24 will be resubmitted to process 400 to determine whether the new perspective ratios exceed the limit set by W_Ratio_Threshold.

Once all perspective ratios of all edges of all polygons of the display list are less than the selected perspective threshold, the procedure of FIG. 4 is terminated and the graphics data may be rendered to the display screen 105 without noticeable artifacts. To avoid creating tearing or creation of artifacts when two triangles, such as triangle ABD and BCD, share a common co-linear edge (such as, for example, edge BD), the present invention consistently splits edges in the same location. It is an advantage of the present invention that inserted vertices will always be at the identical coordinate on common edges regardless of whether triangle ABD or BCD is processed for display and without regard to relative positioning of the triangles in the display stream. Accordingly, the object is rendered without missing pixels or gaps along common or co-linear edges.

For image rendition requiring high image quality, the W_Ratio_Threshold can be selected so that each triangle is divided into a higher number of triangles in order to achieve the desired image quality. For example, W_Ratio_Threshold may be selected from the range of 1.2 to a maximum value where such maximum value is a function of graphics subsystem 109. Alternatively, if high image quality is not required or desired due to memory or speed constraints, the variable, W_Ratio_Threshold, may be selected from the range of 1.5 to about 3 or 5. The actual range may be selected based on the type of images being rendered and the viewer's balance of performance over quality.

STEP 485 OF PROCESS 400

Figures 6A, 6B:
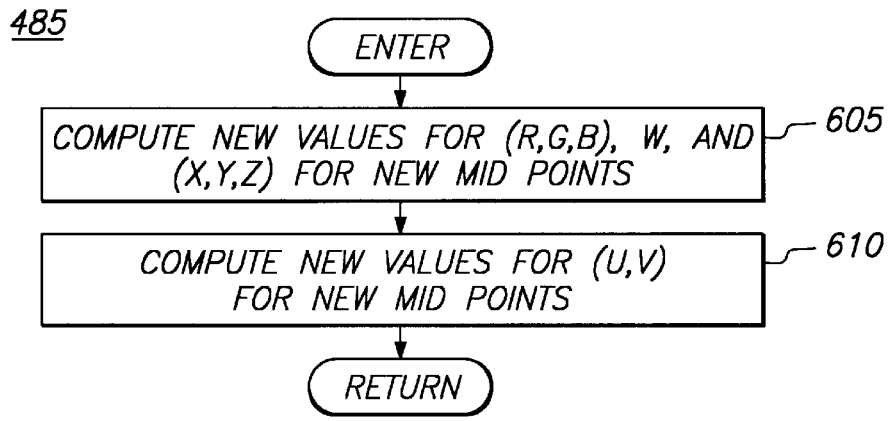
FIG. 6A and FIG. 6B illustrate a flow diagram of processing logic for determining new 3-D coordinates (x, y, z), perspective terms (W), texture coordinates (u, v), and color values (R, G, B) for midpoints determined in accordance with the present invention.

As discussed above, at step 485 of FIG. 4B, the three dimensional coordinates (x, y, z), the colors (R, G, B), the texture coordinates (u, v) and the perspective value, W, are computed for all midpoints 12, 20, and 30. FIGS. 6A and FIG. 6A illustrate a flow chart of the steps performed by process 485 used to determine these values in accordance with the present invention. At step 610 of FIG. 6A, the new values for (R, G, B), (x, y, z) and W are computed for each new midpoint generated by process 400. The following relationships are used assuming an edge comprising vertex A and vertex B is divided and assuming further vertex A has coordinates (xA, yA, zA) and vertex B has coordinates (xB, yB, zB). Further, vertex A has perspective term, WA, and colors (RA, GA and BA) and vertex B has perspective term, WB, and colors (RB, GB and BB). Step 600 is performed using the following relationships:

$$Wmidpoint=(WA+WB)/2$$

$$Rmidpoint=(RA+RB)/2$$

$$Gmidpoint=(GA+GB)/2$$

$$Bmidpoint=(BA+BB)/2$$

$$xmidpoint=(xA+xB)/2$$

$$ymidpoint=(yA+yB)/2$$

$$zmidpoint=(zA+zB)/2$$

where (xmidpoint, ymidpoint, zmidpoint) are the (x, y, z) coordinates of the new midpoint of the divided edge (AB), (Rmidpoint, Gmidpoint, Bmidpoint) are the (R, G, B) color values of the new midpoint, and Wmidpoint is the perspective term of the new midpoint of the divided edge.

Values for texture coordinates (u, v) at the midpoint of the divided edge, that is (umid, vmid), are calculated by step 610 of FIG. 6A which is described in more detail in the processing logic shown in FIG. 6B. At processing step 615 the texture coordinates, (uA, vA) and (uB, vB), and perspective terms, WA and WB, for each vertex (e.g., vertex A and vertex B) bounding a divided edge are obtained. At process step 620, intermediate variables, a and b, are calculated according to the following relationships:

$$a=uA*WA$$

where uA denotes the u-axis texture coordinate at vertex A while WA denotes the perspective value at vertex A; and $$b=uB*WB$$

where uB denotes the u-axis texture coordinate at vertex B while WB denotes the perspective value at vertex B. Intermediate variable, c, is then calculated at process step 625 of FIG. 6B according to the relationship below:

$$c=(a+b)/2$$

and umid is then calculated at process step 630 according to:

$$umid=c/Wmid$$

As shown in processing steps 635–650, a value for vmid is calculated in accordance with the process logic in steps 620–630 by replacing u-axis texture coordinates, uA and uB, with the corresponding v-axis texture coordinates, vA and vB for vertices A and B. At the completion of step 650, the texture coordinates (umid, vmid) are computed. With the newly determined texture coordinates, texture data can interpolated for pixels within each triangle based on the (u, v) coordinates assigned to the vertices of the triangle.

In one embodiment, the present invention does not require substantial, if any, modification to be made to hardware graphics subsystems previously installed in computer system 112. Although described with respect to an interpolation driven texture mapping/rendering system, the present invention polygon split procedure can operate in conjunction with any hardware subsystem that performs 3-D texture mapping operations.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

What is claimed is:

1. In a computer controlled graphics display system wherein objects are represented by data structures defining: the orientation and location of a plurality of polygons; and texture data defining surface characteristics of said object, said data structures at least partially stored in computer memory prior to rendering on a display screen, a method for subdividing polygons having a high degree of perspective, said method comprising the steps of:

(a) selecting, from said computer memory, a selected polygon from said plurality of polygons that at least partially define a depiction of said object, said selected polygon comprising at least three vertices wherein each vertex has a perspective term, W, associated therewith that defines a display perspective of said associated vertex with respect to a given viewing angle;

(b) determining perspective ratios for each pair of adjacent vertices of said at least three vertices of said selected polygon;

(c) subdividing said selected polygon to generate a plurality of new polygons provided any of said perspective ratios exceeds a preselected perspective threshold amount; and (d) rendering and displaying said selected polygon on a display screen of said computer controlled graphics display system provided none of said perspective ratios exceeds said preselected perspective threshold amount.

2. A method as described in claim 1 further comprising the step of: (e) repeating said steps of (a)–(c) for each new polygon generated by said step (c).

3. A method as described in claim 1 wherein said step (c) comprises the steps of:

(c1) dividing said selected polygon into four new polygons provided three edges of said selected polygon have perspective ratios exceeding said preselected threshold amount;

(c2) dividing said selected polygon into three new polygons provided only two edges of said selected polygon have perspective ratios exceeding said preselected threshold amount; and (c3) dividing said selected polygon into two new polygons provided only one edge of said selected polygon has a perspective ratio exceeding said preselected threshold amount.

4. A method as described in claim 3 wherein said step (c1) comprises the step of inserting three mid-points between adjacent vertex pairs of said selected polygon to constitute new vertices for said four new polygons, wherein said step (c2) comprises the step of inserting two midpoints between adjacent vertex pairs of said selected polygon to constitute new vertices for said three new polygons, and wherein said step (c3) comprises the step of inserting one mid-point between an adjacent vertex pair of said selected polygon to constitute a new vertex for said two new polygons.

5. A method as described in claim 4 further comprising the step of determining data for each inserted midpoint resultant from said steps (c1), (c2), and (c3), said data comprising: three dimensional coordinate values (x, y, z); texture map coordinate values (u, v); color (R, G, B); and perspective terms (W).

6. A method as described in claim 5 wherein said step of determining data for each inserted midpoint comprises the steps of:

(1) calculating a perspective term, Wmid, for a midpoint of a given adjacent pair of vertices, A and B, in accordance with:

$$Wmid=(WA+WB)/2$$

where WA and WB denote perspective terms for said vertices A and B, respectively;

(2) calculating intermediate variables, a and a', in accordance with:

$$a=uA*WA$$

$$a'=vA*WA$$

where uA and vA respectively denote the u-axis and v-axis texture coordinates for said vertex A;

(3) calculating intermediate variables, b and b', in accordance with:

$$b=uB*WB$$

$$b'=vB*WB$$

where uB and vB respectively denote the u-axis and v-axis texture coordinates for said vertex B;

(4) calculating intermediate variables, c and c', in accordance with:

$$c=(a+b)/2$$

$$c'=(a'+b')/2; \text{ and}$$

(5) calculating umid and vmid in accordance with:

$$umid=c/Wmid$$

$$vmid=c'/Wmid$$

where umid and vmid are the texture coordinates for said midpoint.

7. A method as described in claim 1 wherein for a given pair of adjacent vertices, A and B, said step (b) comprises the steps of:

(b1) dividing a perspective term associated with vertex A with a perspective term associated with adjacent vertex B to obtain a first perspective ratio associated with said given pair of adjacent vertices; and (b2) dividing said perspective term associated with vertex B with said perspective term associated with adjacent vertex A to obtain a second perspective ratio associated with said given pair of adjacent vertices.

8. A method as described in claim 1 wherein said preselected threshold is between the range of 1.25 to 1.5.

9. A method as described in claim 1 further comprising the step of receiving said preselected threshold amount from a user defined adjustment.

10. In a computer controlled graphics display system having a processor coupled to bus, and a graphics subsystem coupled to said bus, and wherein objects are represented by a plurality of polygons and texture data defining surface characteristics of object, a computer readable memory unit coupled to said bus and storing instructions therein that when executed causing said system to implement a method for subdividing polygons having a high degree of perspective, said method comprising the steps of:

(a) selecting, from said computer memory, a selected polygon from said plurality of polygons that at least partially define a depiction of said object, said selected polygon comprising at least three vertices wherein each vertex has a perspective term, W, associated therewith that defines a display perspective of said associated vertex with respect to a given viewing angle;

(b) determining perspective ratios for each pair of adjacent vertices of said at least three vertices of said selected polygon;

(c) subdividing said selected polygon to generate a plurality of new polygons provided any of said perspective ratios exceeds a preselected perspective threshold amount; and (d) rendering and displaying said selected polygon on a display screen of said computer controlled graphics display system provided none of said perspective ratios exceeds said preselected perspective threshold amount (e) repeating said steps (a)–(d) for each polygon of said plurality of polygons.

11. A computer readable memory unit as described in claim 10 wherein said method further comprises the step of:
(f) repeating said steps of (a)–(c) for each new polygon generated by said step (c).

12. A computer readable memory unit as described in claim 10 wherein said step (c) comprises the steps of:

(c1) dividing said selected polygon into four new polygons provided three edges of said selected polygon have perspective ratios exceeding said preselected threshold amount;

(c2) dividing said selected polygon into three new polygons provided only two edges of said selected polygon have perspective ratios exceeding said preselected threshold amount; and (c3) dividing said selected polygon into two new polygons provided only one edge of said selected polygon has a perspective ratio exceeding said preselected threshold amount.

13. A computer readable memory unit of claim 12 wherein said step (c1) comprises the step of inserting three mid-points between adjacent vertex pairs of said selected polygon to constitute new vertices for said four new polygons, wherein said step (c2) comprises the step of inserting two mid-points between adjacent vertex pairs of said selected polygon to constitute new vertices for said three new polygons, and wherein said step (c3) comprises the step of inserting one mid-point between one adjacent vertex pair of said selected polygon to constitute a new vertex for said two new polygons.

14. A computer readable memory unit as described in claim 13 wherein said method further comprises the step of determining data for each inserted midpoint as a result of said steps (c1), (c2), and (c3), said data comprising: three dimensional coordinate values (x, y, z); texture map coordinate values (u, v); color (R, G, B); and perspective terms (W).

15. A computer readable memory unit as described in claim 14 wherein said step of determining data for each inserted midpoint comprises the steps of:

(1) calculating a perspective term, Wmid, for a midpoint of a given adjacent pair of vertices, A and B, in accordance with:

$$Wmid=(WA+WB)/2$$

where WA and WB denote perspective terms for said vertices A and B, respectively;

(2) calculating intermediate variables, a and a', in accordance with:

$$a=uA*WA$$

$$a'=vA*WA$$

where uA and vA respectively denote the u-axis and v-axis texture coordinates for said vertex A;

(3) calculating intermediate variables, b and b', in accordance with:

$$b=uB*WB$$

$$b'=vB*WB$$

where uB and vB respectively denote the u-axis and v-axis texture coordinates for said vertex B;

(4) calculating intermediate variables, c and c', in accordance with:

$$c=(a+b)/2$$

$$c'=(a'+b')/2 \; ; \text{ and}$$

(5) calculating umid and vmid in accordance with:

$$umid=c/Wmid$$

$$vmid=c'/Wmid$$

where umid and vmid are the texture coordinates for said midpoint.

16. A computer readable memory unit as described in claim 10 wherein for a given pair of adjacent vertices, A and B, said step (b) comprises the steps of:

(b1) dividing a perspective term associated with vertex A with a perspective term associated with adjacent vertex B to obtain a first perspective ratio associated with said given pair of adjacent vertices; and (b2) dividing said perspective term associated with vertex B with said perspective term associated with adjacent vertex A to obtain a second perspective ratio associated with said given pair of adjacent vertices.

17. In a computer controlled graphics display system wherein objects are represented by data structures defining a plurality of polygons and texture data defining surface characteristics of said object, a method for subdividing polygons having a high degree of perspective, said method comprising the steps of:

(a) selecting, from said computer memory, a selected polygon from said plurality of polygons, said selected polygon comprising at least three vertices wherein each vertex has a perspective term, W, associated therewith that defines a display perspective of said associated vertex with respect to a given viewing angle;

(b) determining perspective ratios for each pair of adjacent vertices of said at least vertices of said selected polygon;

(c) subdividing said selected polygon to generate a plurality of new polygons provided any of said perspective ratios exceeds a preselected perspective threshold amount, wherein said step (c) comprises the steps of:

(c1) dividing said selected polygon into four new polygons provided three edges of said selected polygon have perspective ratios exceeding said preselected threshold amount;

(c2) dividing said selected polygon into three new polygons provided only two edges of said selected polygon have perspective ratios exceeding said preselected threshold amount; and (c3) dividing said selected polygon into two new polygons provided only one edge of said selected polygon has a perspective ratio exceeding said preselected threshold amount; and (d) rendering and displaying said selected polygon on a display screen of said computer controlled graphics display system provided none of said perspective ratios exceeds said preselected perspective threshold amount.

18. A method as described in claim 17 further comprising the steps of:

(e) repeating said steps (a)–(d) for each polygon of said plurality of polygons; and (f) repeating said steps of (a)–(c) for each new polygon generated by said step (c).

19. A method as described in claim 17 wherein said step (c1) comprises the step of inserting three mid-points between adjacent vertex pairs of said selected polygon to constitute new vertices for said four new polygons, wherein said step (c2) comprises the step of inserting two midpoints between adjacent vertex pairs of said selected polygon to constitute new vertices for said three new polygons, and wherein said step (c3) comprises the step of inserting one mid-point between one adjacent vertex pair of said selected polygon to constitute a new vertex for said two new polygons.

20. A method as described in claim 17 wherein for a given pair of adjacent vertices, A and B, said step (b) comprises the steps of:

(b1) dividing a perspective term associated with vertex A with a perspective term associated with adjacent vertex B to obtain a first perspective ratio associated with said given pair of adjacent vertices; and (b2) dividing said perspective term associated with vertex B with said perspective term associated with adjacent vertex A to obtain a second perspective ratio associated with said given pair of adjacent vertices.

* * * * *